United States Patent [19]
Mayer

[11] 4,078,708
[45] Mar. 14, 1978

[54] RACK FOR VEHICLE MOUNTING OF SKI EQUIPMENT

[76] Inventor: Leo W. Mayer, 578 S. Alkire, Lakewood, Colo. 80228

[21] Appl. No.: 597,695

[22] Filed: Jul. 21, 1975

[51] Int. Cl.² .............................................. B60R 9/00
[52] U.S. Cl. .............................. 224/29 R; 211/60 SK
[58] Field of Search .......... 224/29 R, 42.03 R, 42.06, 224/42.07, 42.08, 42.1 R, 42.1 B, 42.1 C, 42.1 D, 42.1 E, 42.1 F, 42.1 G, 42.21, 42.32, 42.38, 42.39, 42.4, 42.45 R, 45 S; 70/58; 211/60 SK; 214/450; 280/11.37 A, 11.37 C, 11.37 K

[56] References Cited
U.S. PATENT DOCUMENTS

| | | | |
|---|---|---|---|
| Re. 27,170 | 10/1971 | Porter | 224/29 R |
| 2,042,086 | 5/1936 | Aubert | 280/11.37 A |
| 2,106,503 | 1/1938 | Hendrick | 211/60 SK X |
| 2,409,103 | 10/1946 | Cameron | 224/42.45 R X |
| 2,807,398 | 9/1957 | Mathews | 224/42.45 R X |
| 3,242,704 | 3/1966 | Barreca | 224/42.1 F X |
| 3,504,921 | 4/1970 | Osmond | 280/8 |
| 3,606,111 | 9/1971 | Gjesdahl | 224/29 R X |
| 3,610,491 | 10/1971 | Bott | 224/29 R |
| 3,753,359 | 8/1973 | Frey | 70/58 X |
| 3,776,437 | 12/1973 | Carney | 224/42.1 F X |
| 3,854,641 | 12/1974 | Kohls | 224/29 R |
| 3,972,457 | 8/1976 | Kesler | 224/42.13 X |

FOREIGN PATENT DOCUMENTS

| | | | |
|---|---|---|---|
| 744,882 | 1/1933 | France | 224/42.32 |
| 2,155,237 | 5/1973 | Germany | 280/11.37 A |

OTHER PUBLICATIONS

J. C. Whitney, Catalog No. 314, Copyright 1973, Van Rear Door Tire Carriers, p. 31.

*Primary Examiner*—Lawrence J. Oresky
*Assistant Examiner*—Winston H. Douglas
*Attorney, Agent, or Firm*—John E. Reilly; James R. Young

[57] ABSTRACT

A frame composed of side members and interconnecting cross bars is attached to a generally flat surface by arrangements which hold the rack or frame in spaced relation to the surface. Releasable clamping devices are arrayed on the cross bars for temporary cargo storage. One form of clamping device is particularly well suited for retaining elongated flat objects such as skis in a position which is perpendicular to the rack on the side opposite the attachment to the surface. By employing three cross bars for the rack, ski lengths of various dimensions can be accommodated and, when used in conjunction with a vertical van type vehicle door, the rack can concurrently provide a ladder function. A trough and clamping bar arrangement between the flat surface to which the rack is mounted and the members of the rack can accommodate other elongated objects such as ski poles.

5 Claims, 10 Drawing Figures

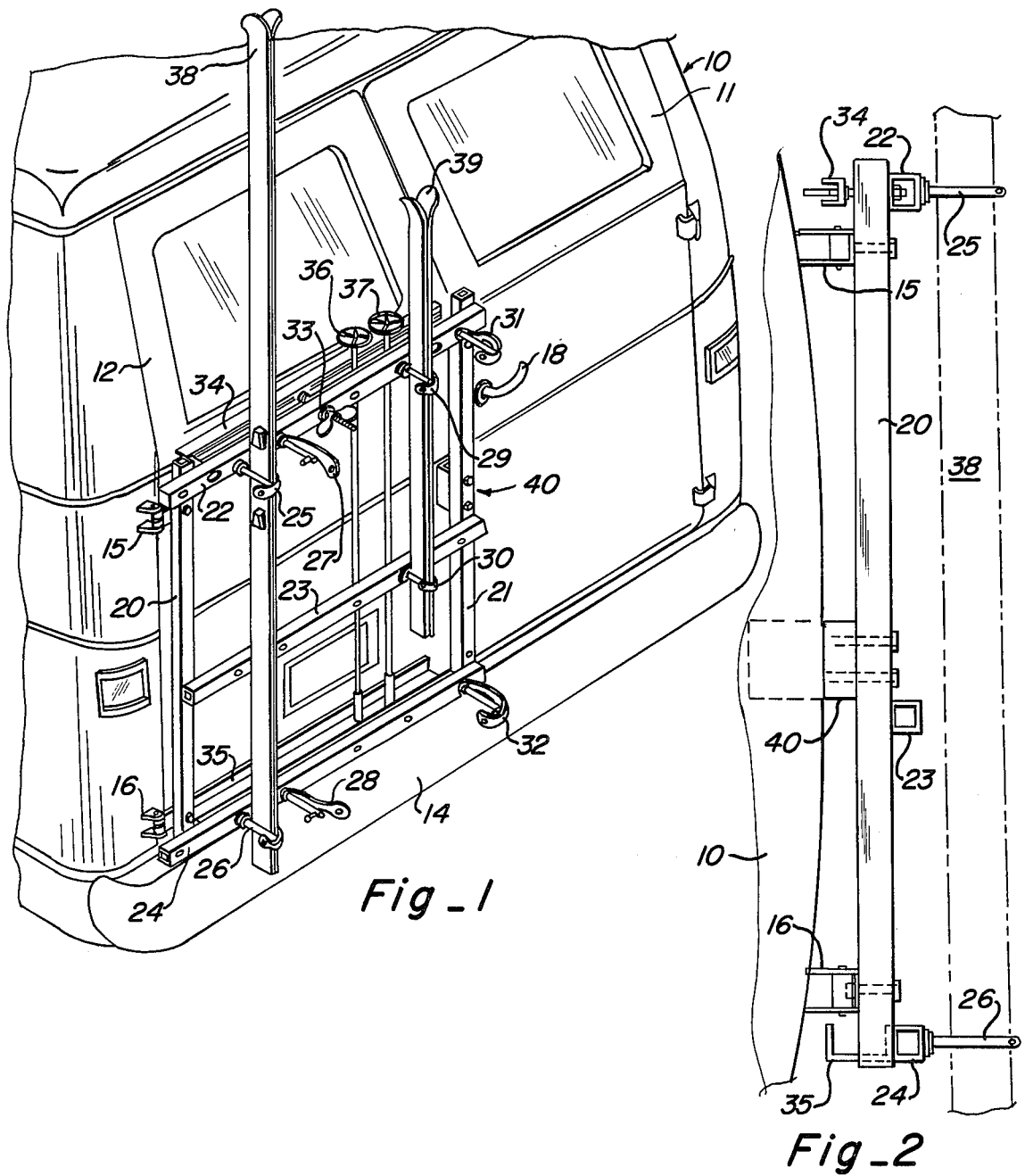
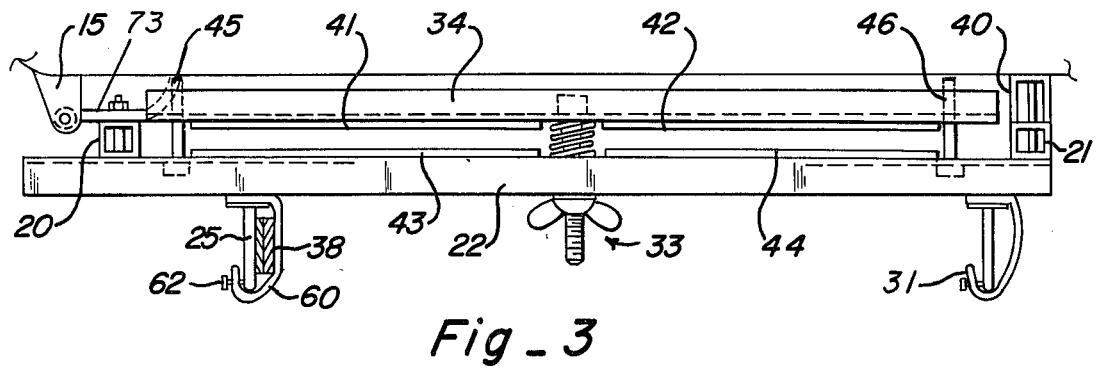

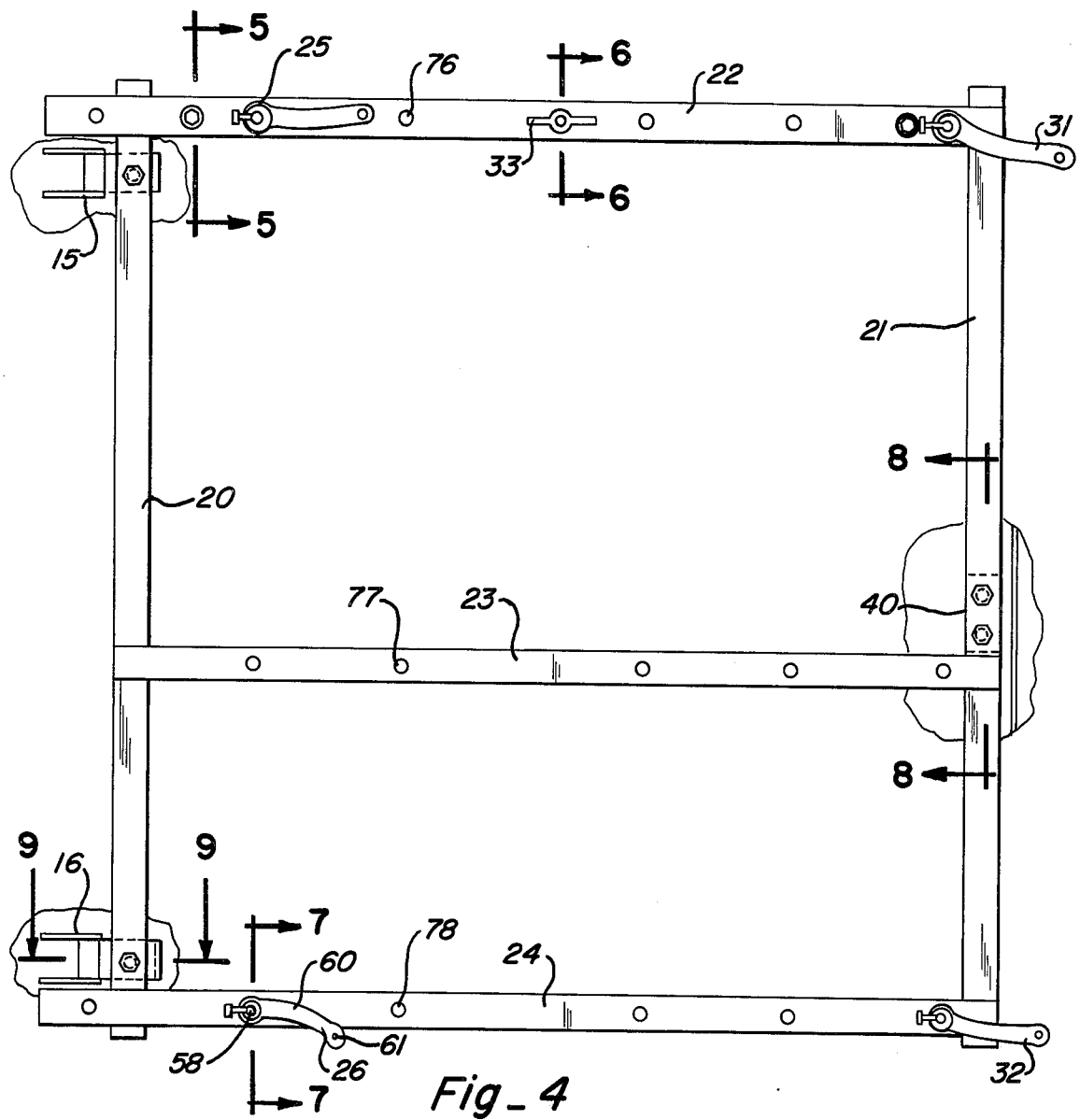
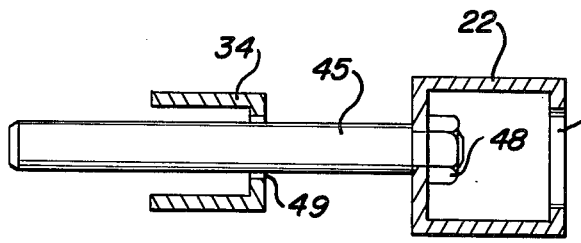
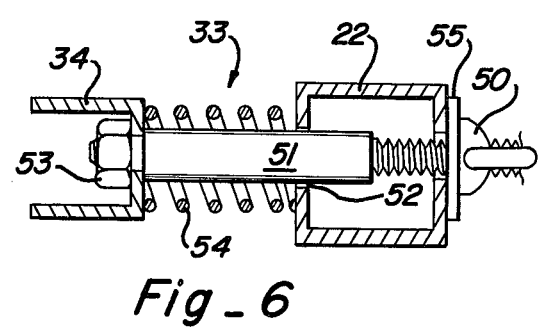

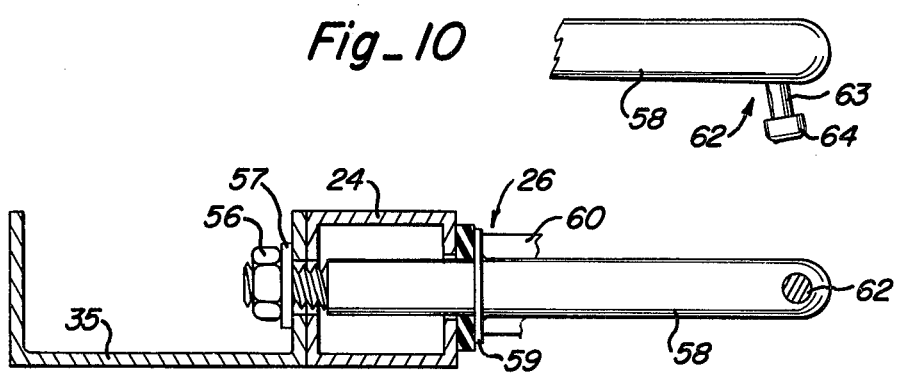
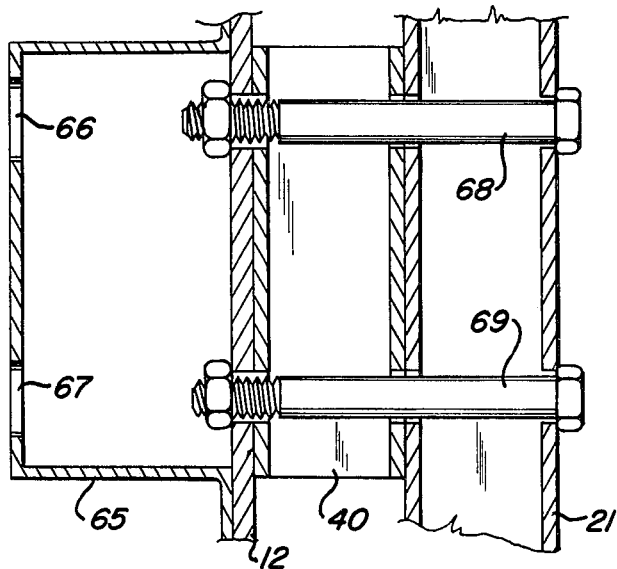
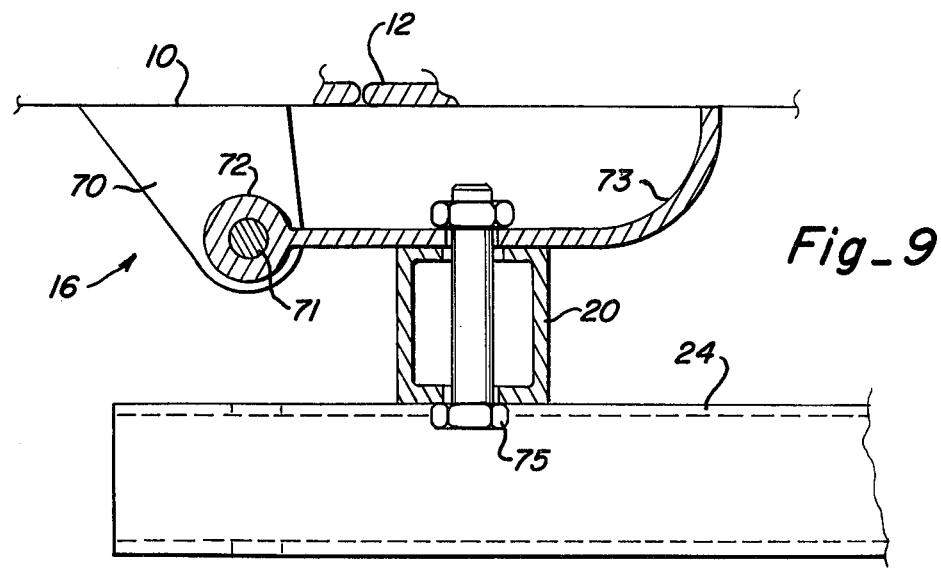

RACK FOR VEHICLE MOUNTING OF SKI EQUIPMENT

BACKGROUND OF THE INVENTION

The present invention relates to apparatus for temporarily attaching objects such as skis and ski poles to a flat surface in a secure manner. More particularly, the present invention relates to apparatus for temporarily attaching awkwardly shaped items such as ski equipment or the like to a vertical, generally flat surface of a vehicle. The present invention is especially useful for securely fastening skis, ski poles and the like to a vertically mounted door such as are employed on van-type vehicles.

The various passenger vehicles available for all their many advantages have significant disadvantages when it comes to transporting relatively long or awkwardly shaped objects such as skis, ski poles, bicycles and so forth.

The interiors of such vehicles either cannot accommodate ski equipment or alternatively are not well-suited to interior carrying thereof. Accordingly, there have been many efforts directed towards providing a mounting rack on the exterior of the vehicle which can accommodate the skis or other awkward equipment. Ordinary cartop carriers have been used in many instances but such devices are awkward as anyone who has removed skis from the middle of such a cartop carrier can attest. One suggested solution is to render the entire rack removable with the equipment in place as is shown in U.S. Pat. Nos. 3,504,921 by Osmond and 2,764,381 by Anderson. Since removing entire racks with the attached equipment is no less awkward than attempting to remove individual skis from the roof of the vehicle, there have been other efforts to attach mounting racks to the rear bumper or trunk lid of the vehicle as are shown in U.S. Pat. Nos. 2,106,503 by Hendrick, 2,409,103 by Cameron, Re, 27,170 by Porter and 3,439,707 by Wright. It has also been suggested that skis can be temporarily attached by an upright pin and engaging strap arrangement as are shown in the aforementioned Porter patent and also in U.S. Pat. No. 3,242,704 by Barreca.

Although many of the suggested rack mounting configurations are suitable for a variety of passenger vehicles, none provide a satisfactory solution for the presently popular van-type vehicle which has a relatively high roof and vertical sides including the rear thereof. Removal of ski equipment from a roof-mounted carrier on such vans is extremely awkward and difficult even for skis attached near the roof edge. Further, the existing ski racks do not provide convenient accommodations for ski poles which are also awkward for storage within the vehicle itself. In addition, the existing racks are generally not well-adapted for accommodating a mix of both long and short skis.

SUMMARY OF THE INVENTION

The present invention contemplates a rack for temporary storage of cargo of different sizes and shapes and is particularly advantageous for mounting elongated objects of various sorts such as skis and ski poles of differing lengths. More particularly, the present invention is an elongated object mounting arrangement especially suited for use on vehicles which have van-type body configurations. The mounting rack of the present invention is composed of a main frame having two side members which are interconnected into a relatively rigid structure by a plurality of cross members. The frame is affixed to a flat surface such as the door of a van by an attaching arrangement which retains the rack in spaced relation from the surface. One or more pairs of vertical posts and mating straps are attached to the cross bars so as to retain flat objects such as skis in a perpendicular position relative to the rack away from the mounting surface. The pairs of posts and straps can be positioned as between any of the cross bars so as to accommodate either long or short skis or the like. As applied to a van-type vehicle, the spaced relation of the rack relative to the mounting surface and the multiplicity of cross bars coincidentally provides a ladder function for facilitating access to the roof of the vehicle in addition to providing the cargo or ski mounting configuraton.

A still further feature of the present invention resides in a retaining trough and clamping bar arrangement on the side of the main frame opposite the ski mounting post. That is, the clamping bar and trough arrangement is particularly well-suited for retaining objects which are not adapted to the mounting post arrangement such as ski poles or the like and can retain these objects between the rack and the door or mounting surface.

A still further feature of this invention resides in the three-point surface mounting arrangement which is particularly well-suited for accommodating the location of hinges and door latch apparatus on existing van-type vehicle doors.

An object of this invention is to provide a rack for temporarily attaching objects relative to a flat surface.

Another object of this invention is to provide a rack particularly well-suited for mounting ski equipment in a vertical position relative to the surface of a vehicle but which can be easily arranged to accommodate other cargo externally of the vehicle.

A still further object of this invention is to provide a mounting rack especially useful for the vertical surfaces of a van-type vehicle in a manner which will accommodate skis of various lengths and other devices such as ski poles.

A still further object of this invention is to provide a mounting rack for skis and ski poles which is especially well-suited for use on the vertical doors of a van-type vehicle.

Yet another object of this invention is to provide a rack for temporarily attaching awkward shaped objects such as skis and/or ski poles to a van-type vehicle door in a manner which is compatible with the existing mounting structure of the door.

Other objects, advantages, features and capabilities of the present invention will become more apparent in light of the following detailed description of exemplary preferred embodiments taken in conjunction with the accompanying drawings:

BRIEF DESCRIPTION OF THE DRAWINGS

FIG. 1 is a perspective view of a portion of the rear of a van-type vehicle showing the attachment of a ski rack in accordance with the preferred embodiment of this invention.

FIG. 2 is a side view of the ski mounting rack in accordance with the present preferred embodiment as shown in FIG. 1.

FIG. 3 is a top view of the ski mounting rack shown in FIG. 1.

FIG. 4 is a detailed rear elevation view of the preferred embodiment.

FIG. 5 is a section view taken along lines 5—5 of FIG. 4 showing the guiding arrangement for a clamping structure.

FIG. 6 is a sectional view along lines 6—6 of FIG. 4 illustrating the tightening/releasing apparatus associated with the clamping bar.

FIG. 7 is a section view taken along lines 7—7 of FIG. 4 showing the mounting post arrangement.

FIG. 8 is a section view taken along lines 8—8 of FIG. 4 illustrating one mounting configuration relative to the latch portion of a van door.

FIG. 9 is a section view taken along lines 9—9 of FIG. 4 showing the mounting arrangement of the preferred embodiment relative to a typical van-type door hinge; and FIG. 10 is a top view of the end of the mounting post shown in FIG. 7.

DETAILED DESCRIPTION OF THE PREFERRED EMBODIMENT

The primary utility of the present invention is envisioned in conjunction with a van-type vehicle 10 and will thus be described in this environment although the invention is not necessarily limited thereto. Such vehicles frequently employ two hinged doors 11 and 12 at the rear thereof. Typically doors such as 12 are rigidly attached by offset hinge arrangements 15 and 16 along one side and centrally latched as at 18. Doors such as 12 are generally constructed with relatively rigid structural members along the edges as where hinges 15 and 16 are attached and also where the latch cooperates with handle 18 is positioned. The skin of the door is generally of less solid structure and thus not well-suited to attachment of ski racks or the like between the edges thereof.

The main frame of the rack is composed of two side members 20 and 21 which are rigidly interconnected by three cross bars 22-24. Cross bars 22-24 in the preferred embodiment are welded in overlapping relation over side bars 20 and 21 but they could as well be attached by any suitable means or otherwise positioned such as in abutting relation to side members 20 and 21. As will be discussed later, a plurality of pairs of mounting assemblies 25-26, 27-28, 29-30 and 31-32 can be positioned via bolting to aligned holes in cross bars 22-23 and 24 for retaining skis such as 38 and 39 in a perpendiculr position relative to the main frame. As illustrated in FIG. 1, post and strap attaching assemblies 25 and 26 are attached to cross bars 22 and 24 so as to accommodate relatively long skis 38. It should be further appreciated that shorter skis 39 can be accommodated by attaching the lower post and strap assembly 30 to cross bar 23 in the appropriate alignment hole.

A clamping bar 34 is positioned on the reverse side of the cross bar 22 and tightened or released by wing nut assembly 33. By attaching a trough or channel apparatus 35 at the lower portion of the main frame, such as directly behind lower cross bar 24, ski poles such as 36 and 37 can be positioned so as to be retained at the upper portion of the rack via clamping bar 34 and cross bar 22 while the other end of ski poles 36 and 37 rest within the open portion of the channel or trough 35. This clamping arrangement can accommodate a variety of different devices which are not well-suited for attachment via post and strap assemblies 25-32. However, it should be recognized that one or more of the attachment assemblies 25-32 can be replaced with specialized attachment devices such as for retaining bicycles, motorbikes, containers or other items on the rack.

FIG. 2 shows a side view of the ski rack mount embodiment of FIG. 1. By advantageously utilizing the external extension of hinges 15 and 16 along with the inclusion of spacer 40 and also the overlapping arrangement of cross bars 22-24 relative to side members 20 and 21, the skis such as 38 when attached can actually be retained clear of the lower bumper 14 of the vehicle as illustrated in FIG. 1 and as is more clearly evident from FIG. 2. Of course, an additional channel member somewhat like channel 35 can be included in an extension outwardly from the vehicle body below the lower edge of the rack if it should be desired to insure that the ends of the skis do not extend below the vehicle chassis but it has been found that such additional channeling is not required.

FIG. 3 presents an upper plan view of the FIG. 1 embodiment but with mounting assemblies 27 and 29, skis 39 and poles 36 and 37 omitted. The clamping bar 34 which may typically be a channel member has a plurality of resilient rubber or plastic pads 41 and 42 bonded to the surface thereof facing towards cross beam 22. Similarly, cross beam 22 has resilient pads 43 and 44 bonded to the surface thereof facing clamping bar 34 so that pads 41-44 provide an interface between these two bars to accommodate a range of different size items in clamping relation therebetween. Guide pins 45 and 46 are attached in extending relation from cross bar 22 so as to retain clamping bar 34 in substantially parallel position relative to cross bar 22 as these bars are released or brought together by the manually operated wing nut assembly 33 in proximity to the center of the rack. Guide pin 45 and its interrelationship with bars 22 and 34 is shown in section view in FIG. 5. An access hole 47 is included in cross bar 22 to permit attachment of guide pin 45 via nut 48 with pin 45 being slidably retained within hole 49 of clamping bar 34. In addition the detail of the wing nut assembly 33 is shown in the partially sectioned view of FIG. 6. This assembly includes a wing nut 50 which is threaded onto shoulder bolt 51 which is in turn slidably engaged within hole 52 in cross beam 22. A common washer 55 is interposed between wing nut 50 and cross beam 22 to provide a bearing surface for the wing nut 50. The other end of shoulder bolt 51 is retained in fixed relation relative to clamping bar 34 by nut 53 and bars 22 and 34 are biased in a separating direction by interposed spring 54. The action of spring 54 is to retain bars 22 and 34 in a separated position to accommodate insertion and/or removal of items therebetween and still accommodate sufficient movement between bars 22 and 32 for manual tightening via wing nut 50.

FIG. 7 which is a partially sectioned view taken along lines 7—7 of the elevation view of FIG. 4 illustrates both the relationship of the lower or channel member 35 and the detail of attaching one post and strap assembly 26. A nut 56 and washer 57 arrangement retains a continuous post 58 with its integral shoulder 59 so that channel member 35 is attached to the lower cross beam 24. FIG. 7 particularly illustrates the upwardly opening characteristics of the U-shaped cross-section of channel member 35 for receiving one end of items to be clamped in place by clamping bar 34. Further, a strap 60 which is fabricated of flexible material is also retained in place by shoulder 59 at the base of post 58. Although strap 60 is shown in broken view in FIG. 7, the other end thereof includes a bore transversely therethrough as is generally shown at 61 in FIG. 4 for cooperatively engaging the nub 62 at the far end of post 58. Nub 62 is shown in a top view in FIG. 10 and includes a reduced cylindrical portion 63 and a larger button 64 arranged to forcibly receive bore 61 of strap 60 and retain it in place as is generally illustrated in FIG. 3 for attaching assembly 25. It has been found that by tilting the nub assembly 62 by approximately 10° to 15° from perpendicular and outwardly from the base of post 58 as is shown in FIG. 10, the attachment and removal of strap 60 is facilitated as compared to placing nub 62 at a true perpendicular to post 58.

FIG. 8, as partially sectioned view along 8-8 of FIG. 4, shows the attachment arrangement for retaining side member 21 relative to the van door 12. As is the case for many such vans, a box-like structure 65 is rigidly attached to the rear surface of door 12 to accommodate positioning of the latching mechanism. Access holes 66 and 67 can be drilled into the rear face of box 65 to permit attachment of shoulder bolts 68 and 69 so as to retain the entire assembly in a relativey rigid position as shown, it being understood that shoulder bolts 68 and 69 can be extended completely through box structure 65 if desired although the modification as shown reduces the hazard of bolts extending into the interior of the vehicle. Additional or slotted bolt holes through vertical side member 21 can be included for accommodating different attachment locations relative to the structurally strong edge of door 12, if desired.

The partially sectioned view of FIG. 9 illustrates the manner of advantageously utilizing the structure associated with many van door hinge assemblies such as 16 to provide offset mounting for the rack. As is the case for many such hinge assemblies, ears such as 70 retain pivot pins 71 in an offset position relative to the body 10 of the vehicle and a collar arrangement 72 with an extension arm 73 actually provides attachment to door 12 at a rigid structural location thereof. Accordingly, by passing bolt 75 through side member 20 and the extension 73 of hinge 16 as shown in FIG. 9, the entire rack assembly is retained beyond the surface of the door 12 particularly in conjunction with the spacer 40 at the latch attachment so that sufficient clearance for the clamping bar 34 and lower channel 35 is provided. Note that additional or slotted bolt holes can be included along vertical side members 20 or even on horizontal members 22-24 to accommodate differing hinge positions if desired. Alternately, the rack frame can be attached directly to door 12 independent of the hinges via an additional spacer somewhat similar to 40 or the like as long as the left vertical edge is firmly attached to structurally sound portions of the door 12.

In fabrication of apparatus such as has been illustrated for the preferred embodiment, square cross-sectioned tubular members 20-24 can be extruded steel, aluminum or other materials of approximately one inch square. Spacer 40 can be fabricated from a similar square tubular section. Lower trough or channel member 35 can typically be of approximately two inch width and one inch height of similar materials. The posts such as 58 and nub assemblies 62 are preferably steel or other rigid material while the flexible straps such as 60 are preferably of 40 Duro Neoprene material which exhibits best overall flexibility characteristics for both warm and cold environments. For many van-type vehicle rear doors, the width from center line to center line of side members 20 and 21 can typically be slightly over two feet with the distance between the upper edge defining cross bar 22 and the lower edge defining cross bar 24 typically being approximately also slightly over two feet. The center line to center line separation between intermediate cross bar 23 and upper cross bar 22 typically is about one and one-third feet. As is readily apparent in the elevation view of FIG. 4, the inclusion of a series of holes such as 76, 77 and 78 across cross bars 22, 23 and 24 respectively for providing selectable positioning of the post and strap clamping assemblies. The sets of holes such as 76-78 are vertically aligned as shown in FIG. 4 to permit selection of the narrower spacing as between holes 76 and 77 or wider spacing as between 76 and 78 as needed. It should be readily apparent that an intermediate strap and post assembly or the like could be included in hole 77 as well as holes 76 and 78. An added advantage of the inclusion of an intermediate cross bar 23 as shown may result when the rack is used on a van-type vehicle which has a license plate mounting on the lower portion of door 12. Thus, the rack can be employed for retaining longer skis on the outer aligned holes and shorter skis between the intermediate bar 23 and upper bar 22 for the central sections so that the license will continue to be rearwardly visible relative to the vehicle.

Although the exemplary preferred embodiment of the present invention has been described in detail hereinabove, various changes, modifications, additions and applications thereof will be readily apparent to those having normal skill in the art without departing from the spirit of this invention.

What is claimed is:

1. A rack for detachably mounting elongated objects such as skis or ski poles to a generally flat exterior surface of a vehicle comprising in combination:
    a generally rectangular frame including at least two spaced-apart parallel side members rigidly interconnected by at least two parallel cross members, each being attached at respective opposite ends of said side members;
    a plurality of individual support posts adapted to be releasably attached to said cross members and projecting outwardly therefrom, said support posts provided with securing means adapted for releasably securing flat elongated objects thereon;
    a plurality of attachment means on said cross members, said attachment means forming a matrix array of rows and columns and adapted to releasably attach said support posts in outwardly projecting relation to the plane of said rectangular frame;
    a clamping bar adjustably attached to said rectangular frame substantially perpendicular to said side members and parallel to the plane of said rectangular frame, said clamping bar projecting outwardly from said frame in an opposite direction from said support posts and extending the length of said frame;
    two spaced-apart guide pins attached to and protruding from said frame and slidably through said clamping bar, said guide pins allowing said clamping bar to slide toward and away from said frame while preventing said clamping bar from rotating in relation to said frame;
    adjustable clamping means disposed between said two guide pins for moving said clamping bar toward and away from said frame, said clamping means comprising a shaft extending from said clamping bar slidably through one of said cross members and having retaining means thereon for retaining said clamping bar in selected displacement relative to said one of said cross members, said retaining means having a singular release means for releasing and adjusting said clamping bar at its point of engagement with said clamping bar while allowing differential spacing between said clamping bar and said one of said cross members at the respective points of engagement of said guide pins with said clamping bar;

a channel member attached to said rectangular frame on the same side as said clamping bar in substantially parallel relation thereto, said channel member having a trough-shaped opening for receiving an end of an elongated object to retain said object in cooperation with said clamping bar; and mounting means on one side of said frame for rigidly attaching said frame in substantially parallel, closely spaced relation to said flat surface.

2. A rack in accordance with claim 1 further including a cross bar interconnecting said side members at a location intermediate of and in substantial parallel relation to said cross members, said cross bar having a plurality of attachment means thereon, said attachment means positioned in said matrix array.

3. A rack in accordance with claim 1 wherein each of said posts includes a nub extending radially at an acute angle from said post at a location on the periphery of said post in spaced relation to the end of said post and terminating with an enlarged shoulder portion at its outermost extremity, each of said securing means on said posts being defined by a flexible strap permanently attached at one end to the base of said post and a transverse hole through its opposite end for releasable attachment to said nub after having its length passed around an object for fastening such an object to said other side of said main frame.

4. A rack in accordance with claim 1 particularly adapted for use on a generally vertical vehicle door having a pair of externally accessible hinges on one side and a latch on the other side, said mounting means including two devices being connected to respective door hinges for following the pivotal movement thereof and a third attaching device being secured to the vehicle door in proximity to the latch thereof, said attaching devices retaining said main frame in sufficient spaced parallel relation from the surface of the vehicle door for providing clearance for said clamping bar and said channel member.

5. A rack in accordance with claim 1 wherein said adjustable clamping means includes biasing means for applying a resilient biasing force for separating said clamping bar and said one of said cross members.

* * * * *